(12) United States Patent
Pinette

(10) Patent No.: US 7,182,100 B2
(45) Date of Patent: Feb. 27, 2007

(54) RETROFITTABLE MIXING VALVE AND METHOD OF ASSEMBLY

(75) Inventor: Thomas Pinette, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 10/792,606

(22) Filed: Mar. 3, 2004

(65) Prior Publication Data

US 2005/0194051 A1 Sep. 8, 2005

(51) Int. Cl.
*F16K 11/08* (2006.01)

(52) U.S. Cl. .................. 137/625.4; 137/636.3

(58) Field of Classification Search ............ 137/625.4, 137/625.41, 636.2, 636.3
See application file for complete search history.

(56) References Cited

U.S. PATENT DOCUMENTS

| 1,614,437 A | 1/1927 | Cochran |
| 1,677,242 A | 7/1928 | Larrigan |
| 3,056,418 A * | 10/1962 | Adams et al. ......... 137/119.04 |
| 3,167,086 A | 1/1965 | Michalski |
| 3,417,783 A | 12/1968 | Manoogian |
| 3,700,211 A | 10/1972 | Manoogian |
| 3,823,742 A * | 7/1974 | Von Corpon ............. 137/636.3 |
| 3,906,999 A | 9/1975 | Manoogian |
| 3,915,195 A * | 10/1975 | Manoogian et al. ... 137/625.41 |
| 4,108,208 A * | 8/1978 | Saffin von Corpon ... 137/636.3 |
| 4,505,301 A | 3/1985 | Yang |
| 4,565,218 A | 1/1986 | Yang |
| 4,932,433 A | 6/1990 | Knapp |
| 5,832,958 A | 11/1998 | Cheng |
| 5,873,389 A | 2/1999 | Cheng |

FOREIGN PATENT DOCUMENTS

| EP | 0 851 161 B1 | 9/1992 |
| WO | WO 95/10725 | 4/1995 |

* cited by examiner

*Primary Examiner*—John Fox
(74) *Attorney, Agent, or Firm*—Woodard, Emhardt, Moriarty, McNett & Henry LLP

(57) ABSTRACT

A mixing valve cartridge assembly for a spherical mixing valve. The spherical mixing valve has a stem extending therefrom through a support element that embraces a portion of the spherical mixing valve. A keeper secured to the stem so acts with a caming surface to define the range of movement for the stem and to fixture the spherical mixing valve to the support element.

5 Claims, 3 Drawing Sheets

RETROFITTABLE MIXING VALVE AND METHOD OF ASSEMBLY

BACKGROUND OF THE INVENTION

The present invention relates generally to a mixer valve for a faucet incorporating a movable valve element housed in a cartridge and more particularly to a ball valve element housed in a cartridge.

Widespread consumer acceptance has been given to single handle faucets, as shown in U.S. Pat. No. 3,056,418, that control both hot and cold water flow. These faucets are commonly constructed so that a handle or knob is movable in two distinct directions to adjust the mix of hot and cold water and to adjust the volume or flow rate.

Various challenges exist with a ball valve construction. In particular, the ball valve element is mounted between elastomeric inlet seals positioned about the inlet ports of the valve body and a sealing gasket that is mounted under the valve cover. The elastomeric inlet seals and gasket are all yielding and render a floating characteristic to the ball valve element between the valve body and cap. There is no positive lock or locator mechanism that securely positions the ball valve in place. Because the ball valve can be moved in a translational manner against the elastomeric elements, the operator when operating the handle can also move the handle a small amount in any direction including directions not contemplated in the design of the mixing valve. This unwanted motion renders an undesirable spongy feel to the operation of the faucet and an uncertainty to the operator as to the proper operation of the faucet. Furthermore, the spongy feel of the handle gives the impression that the handle is unstable and not assembled properly.

The top sealing gasket provides three functions. Firstly, it seals against leakage of water about the ball. Secondly, its outer periphery seals against the inner surface of the housing to prevent leakage. Thirdly, the gasket resiliently positions the ball downwardly against the inlet seals. As a consequence, the gasket is an expensive component due to its mass and shape. To obtain a smooth operation, the elastomeric sealing gasket often has a thin layer of tetraflourouethylene that contacts the ball valve to reduce wear as compared to direct contact of the elastomeric material with the ball member.

In order to reduce the floating feel, a regulation ring has been incorporated in many ball valve mixing valves. The regulation ring is adjustably screwed into the valve cap. The regulation ring pushes the sealing gasket downward against the ball valve element which in turn is pressed against the inlet seals. The downward placement of the sealing gasket and ball valve element reduces the undesirable motion but does not eliminate it. Furthermore, the combining of the regulation ring with the known gasket increases the cost and complexity of the mixing valve. The increased pressure exerted in the sealing gasket wears down the gasket. As wear and tear progresses, the regulation ring must be repeatedly adjusted to restore pressure on the gasket to both seal and provide the handle with an operating resistance that maintains it in a stable position against gravitational and other forces exerted on a faucet handle.

Heretofore, ball valves have not been amenable to a cartridge construction. Firstly, the floating nature of the traditional ball valve demanded that any cartridge completely surround and capture the ball valve, otherwise the ball valve simply falls out of the bottom of the cartridge. Secondly, the compact nature of the ball valve construction leaves little room for the inclusion of a cartridge. The introduction of traditional cartridges that house and capture the ball into the faucet housing demands that the housing be made taller to incorporate the added height needed for the inclusion of the cartridge.

SUMMARY OF THE INVENTION

The present invention concerns a mixing valve comprising a spherical valve element having flow control passages. A stem is connected to said spherical valve element and extends therefrom. A support element has a surface on one face that embraces a portion of the spherical valve element, the support element having an opening through which the stem extends. The support element has a cam surface on the other face thereof for guiding movement substantially in a given plane. A key element is received over said stem and co-acts with the cam surface to permit movement in the given plane. A keeper is connected to said stem for retaining said key element, support element, and spherical valve element as a unit.

In another form, the present invention concerns a method of assembling a cartridge mixing valve assembly comprising a spherical valve element having flow control passages and a stem extending therefrom through a support element having a surface on one face that embraces a portion of the spherical valve and cam surface on the other face for guiding movement in a given direction. The method comprises the steps of placing a key element over the stem so that it co-acts with the cam surface. A keeper element is placed over the stem and holds the key element against the cam surface. The keeper element is then secured in position on the stem.

It is an object of the present invention to provide an improved ball mixing valve in cartridge form.

SUMMARY OF THE DRAWINGS

FIGS. 1 through 6 show a retrofittable ball cartridge element in conjunction with an existing commercially available ball mixing valve assembly, generally indicated by reference character 10. The particular mixing valve assembly illustrated is used for a kitchen in which a spout may be swiveled to a selected position over a sink. In addition, the valve has an internal diverter valve assembly so that a flexible spray head (not shown) may be selectively employed. It should be understood that the invention has equal applicability to other forms of mixing valve assemblies including those for bathroom sinks, tubs and showers.

The ball mixing valve was introduced in the early 60s and has experienced widespread commercial acceptance. This, in turn, translates into multi-millions of units in service that eventually will need to be refurbished to continue leak-free performance. Many kits for accomplishing this purpose are provided in the marketplace. However, these continue to have deficiencies as pointed out above. The present invention solves these deficiencies by providing a cartridge assembly that is retrofittable with existing units. With this in mind, the invention will be described by initially identifying the existing elements which will not be affected by the replaceable cartridge assembly.

Figure 1:
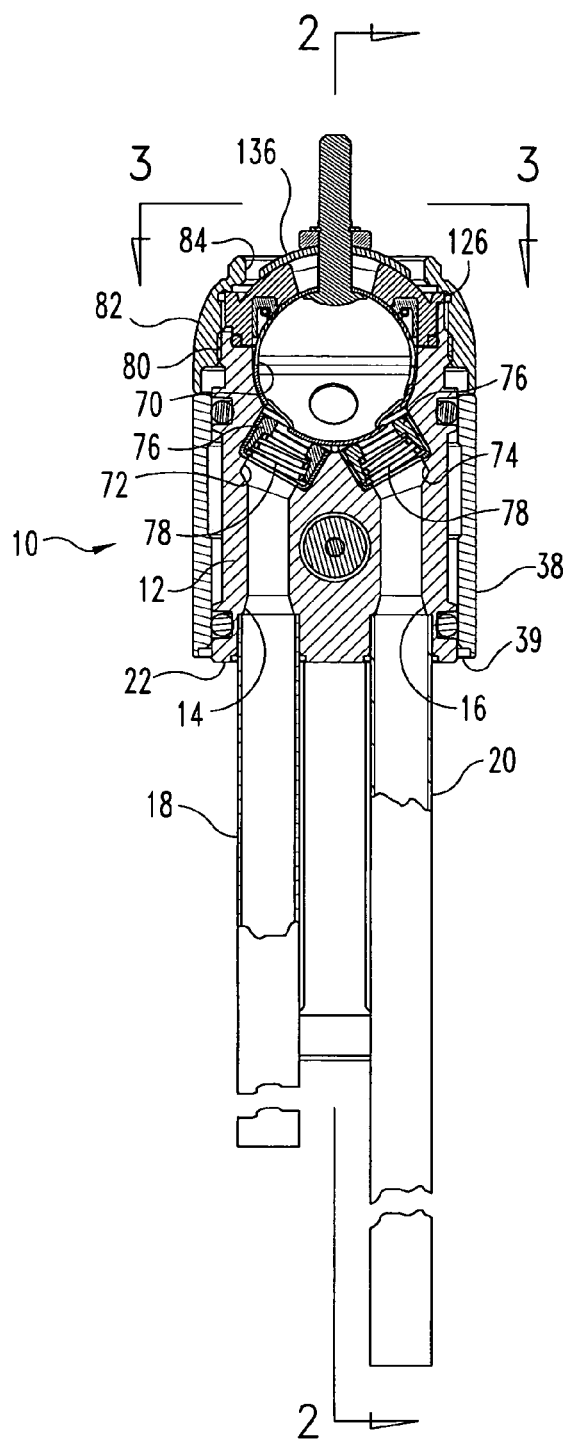
FIG. 1 is a longitudinal section view of a mixing ball valve embodying the present invention.
Figure 2:
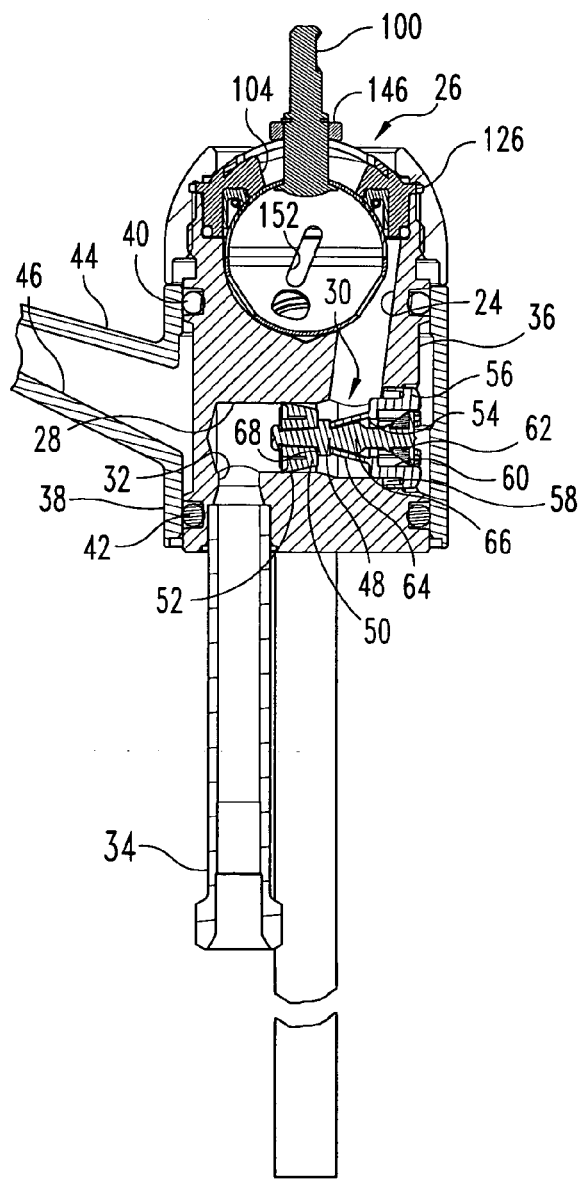
FIG. 2 is a longitudinal section view taken on lines 2—2 of FIG. 1.
Figure 3:
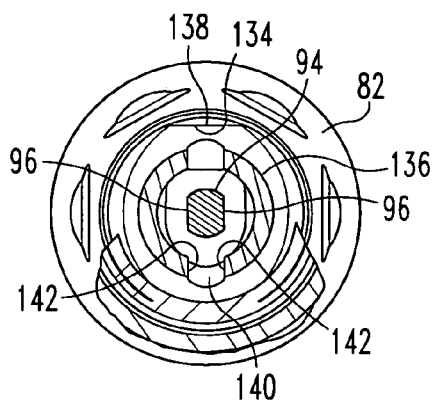
FIG. 3 is a cross section view taken on lines 3—3 of FIG. 1.

Again, referring to FIGS. 1 and 2, there is shown a fixed base comprising an annular assembly 12 having hot and cold inlets 14 and 16 respectively, which in turn receive fluid from supply connection tubes 18 and 20. Fixed base 12 has a lower surface 22, that may be connectable to an escutcheon or other suitable appliance (not shown) for mounting and stabilizing the entire unit. Inlet tubes 18 and 20 are connected to appropriate sources of hot and cold water for supply to the inlet passages 14 and 16. As shown in FIG. 2, an outlet passage 24 provides delivery of appropriately mixed hot and cold fluids from a ball mixing valve cartridge generally indicated by reference character 26. Outlet passage 24 intersects a side bore, 28, in which a diverter valve assembly, generally indicated by reference character 30 is positioned.

As explained below, diverter valve 30 will allow flow of fluid selectively through outlet passage 32 to tube 34 which is connected to a kitchen spray head (not shown). Alternatively, the flow passes to an annular recess 36 on the outer periphery of base 12. An outer sleeve assembly 38 is sealingly connected to the annular space 36 by upper and lower o-rings 40 and 42, respectively. The bottom of sleeve 38 is retained on base 12 by a flange 39. A spout, 44, (a portion of which is shown) has a passage 46 leading to an appropriate outlet or aerator (not shown). For the sake of allowing a better distribution of reference characters, the spout 44 is shown pivoted to the left as shown in FIG. 2. In practice, the spout usually is positioned generally to the right or any other position to direct fluid flow as desired by an operator.

The diverter valve 30 comprises an inner spindle 48, usually formed from brass, and having a first annular resilient valve element 50 leading to outlet passage 32. Resilient valve 50 has a cone-like outer section, 52, which permits flow towards the left as viewed FIG. 2 by virtue of the outer section deflecting radially inward to permit flow. Flow in the opposite direction is prevented by the self-sealing effect of the periphery of cone-like section 52. Spindle 48 extends through an opening 54 in an annular holder 56 which is received against a shoulder 58. Holder 56 has a central opening 60 through which the right hand side of 48 extends. A conical resilient valve element 62 is positioned on the right end of spindle 48 as shown in FIG. 2 and acts to permit or block flow from passage 24 through opening 60 to annular space 36 depending upon the displacement of spindle 48. Holder 56 has a plurality of resilient fingers 64 which extend along a conical section 66 of spindle 48 and abut a shoulder 68 also on spindle 48. Fingers 64 urge the spindle 48 and conical valve element 62 to the left most position so as to block flow through outlet 60.

As is well known in the art, when a spray head handle is open to permit flow from outlet passage 32 and tube 34 flow passes around the periphery of conical section 52 and through the outlet passage 32. When flow from a spray head is stopped or terminated, pressure builds up to the left of the valve assembly 30 causing the valve to be displaced to the right, permitting flow past opening 60 through annular recess 36 and finally through outlet 46. Although the provision of the diverter valve assembly 30 and alternate outlets is common practice, it should be apparent that the replaceable mixing valve assembly 26 may be employed with units not having an outlet diverter valve so that the only outlet from the unit is through passage 24.

Replaceable cartridge 26 is received within a concave hemispherical section 70 formed at the upper end of base 12. A pair of passages 72 and 74 extend radially from hemispherical surface 70 and intersect with passages 14 and 16 respectively. Sealing elements 76 are received in bores 72 and 74 and are urged towards the hemispherical surface 70 by appropriate springs 78. The upper end of base 12 is threaded at 80 to receive an outer annular cover 82, having an upper opening 84 through which the ball-mixing valve extends.

What has been described to this point, except for the reference to valve cartridge 26, is the construction of widely available in-use faucet assemblies. In accordance with the present invention, an improved ball assembly with superior operating characteristics is proposed that will fit within prior units already in service without alteration of any of the existing components. In order to more clearly describe the cartridge assembly 26, attention is directed to FIG. 5 which shows only those elements that are found in the cartridge assembly.

Figure 5:
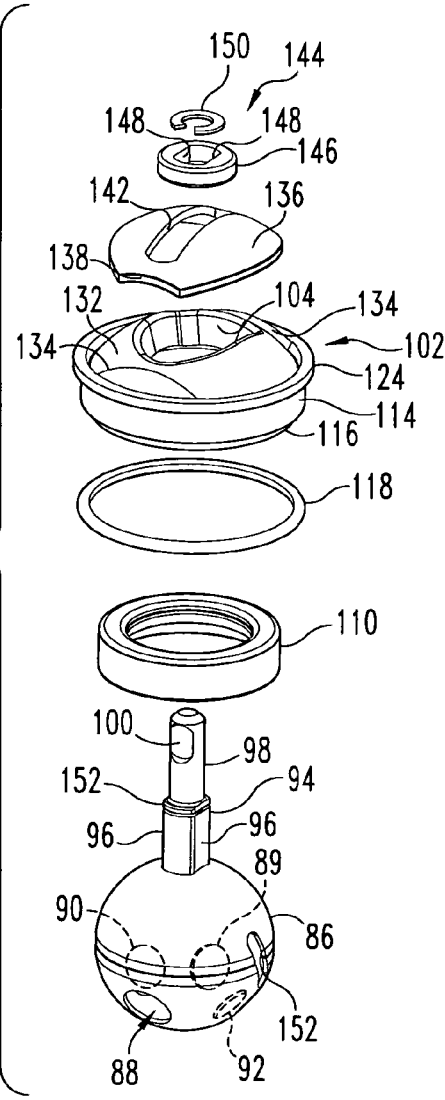
FIG. 5 is a perspective exploded view of the ball valve and associated components of FIGS. 1 and 2 that make up a replaceable cartridge.
Figure 4:
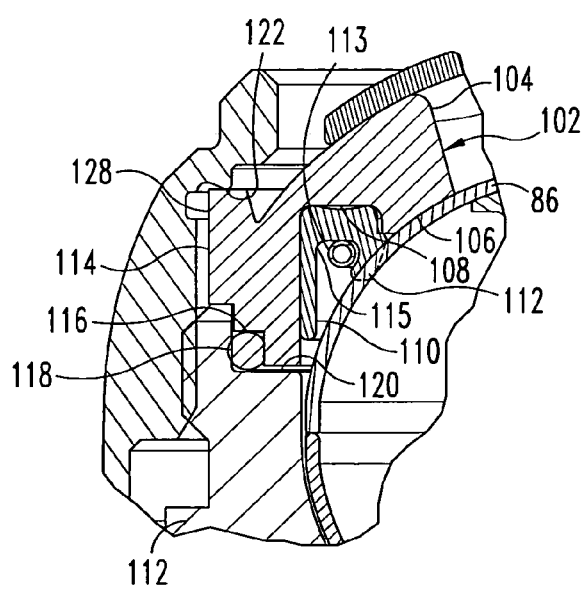
FIG. 4 is a fragmentary highly enlarged view of FIG. 1

Replaceable cartridge assembly 26 comprises a spherical flow control valve element 86, herein shown in a form that has a hollow interior with an outlet passages 88, 89 and inlet passages 90 and 92. Outlet passages 88 and 89 are provided to satisfy different orientation requirements for the outlet from the mixing valve assembly. A stem 94 is connected to and extends from the exterior surface of spherical valve element 86. Stem 94 has an initial section containing substantially parallel flats 96 and an outer circular cross section 98 having a flat 100 for receiving an appropriate set screw to mount an ornamental actuating handle. Spherical ball 86 and stem 94 cooperate with a support element, generally indicated by reference character 102. Stem 94 extends through an opening 104 in support element 102. As shown particularly in FIG. 4, support element 102 has a generally hemispherical shape 106 on the side of the support element 102 which embraces sphere 86. This hemispherical surface 106 has an annular recess 108 which receives a seal element 110, the exterior of which is shown in FIG. 5. Sealing element 110 has a sealing lip 112 which acts in an annular band around the sphere 86 to seal opening 104 from fluid inside passages 14, 16 and 24. A circumferential spring 113 is positioned in an annular through 115 in sealing element 110 to urge sealing lip 112 toward the position shown in dashed lines in FIG. 4.

Support element 102 has an exterior cylindrical surface 114 with a shoulder 116 receiving an o-ring 118. O-ring 118 seals against a shoulder 120 near the upper end of base 12 to seal the outer periphery of support element 102 against base 12. Support element 102 is held in place in base 12 by an abutment 122, herein shown as a ridge, which sandwiches a flange 124 on the upper periphery of support element 102 against an upper edge 126 of base 12 (see FIGS. 1, 2 and 6). In order to properly orient the replaceable cartridge 26 within base 12, a tab 128 is received in slot 130 in the upper end of base 12 (see particularly FIG. 6). It should be noted that the elements interfacing with base 12 and cover 82 have form and fit configurations identical to those already in the field, thereby permitting easy retrofitability.

In order to guide the spherical valve 86 and stem 94 through an appropriate range of motions, a cam surface is provided on the upper side of support element 102 as shown in FIG. 5. The cam surface comprises a hemispherical surface 132 surrounding opening 104 and generally terminating at flange 124. A pair of straight-sided camming surfaces 134 are on opposite sides of surface 132 and parallel to one another to guide movement in a given plane parallel to the two surfaces. A key 136 comprises a washer-like element having a hemispheric shape conforming to surface 132 and having a pair of straight sided surfaces 138 that cooperate with parallel camming surfaces 134 to guide movement of key 136 in a direction parallel to the two surfaces 134. It should be noted that key 136 need not be hemispheric so long as it is configured to abut surface 132 and be guided parallel to surfaces 134. Key 136 additionally has an elongated slot 140 with opposed parallel side walls 142 for guiding movement at right angles to the movement guided by camming surfaces 134. The opposed parallel side walls 142 of slot 140 cooperate with the flats 96 on stem 94 to permit movement of the stem relative to the key 136 substantially in a direction at right angles to the movement of the key 136 relative to the camming surfaces 134.

A keeper assembly, generally indicated by reference character 144, extends over the stem 94 to hold the stem 94, key 136, support element 102 and spherical valve 86 together as a unit. As herein illustrated, the keeper assembly comprises a washer 146 having opposed parallel walls 148 which are received over parallel walls 96 of stem 94 and a snap ring 150 received in a groove 152 on stem 94. It should be apparent that other forms of keeper assemblies may be used depending on the needs and applications. In one form the keeper may comprise a nut threaded onto the stem 94. In another form it may consist of welding the washer 146 in place on the stem.

Figure 6:
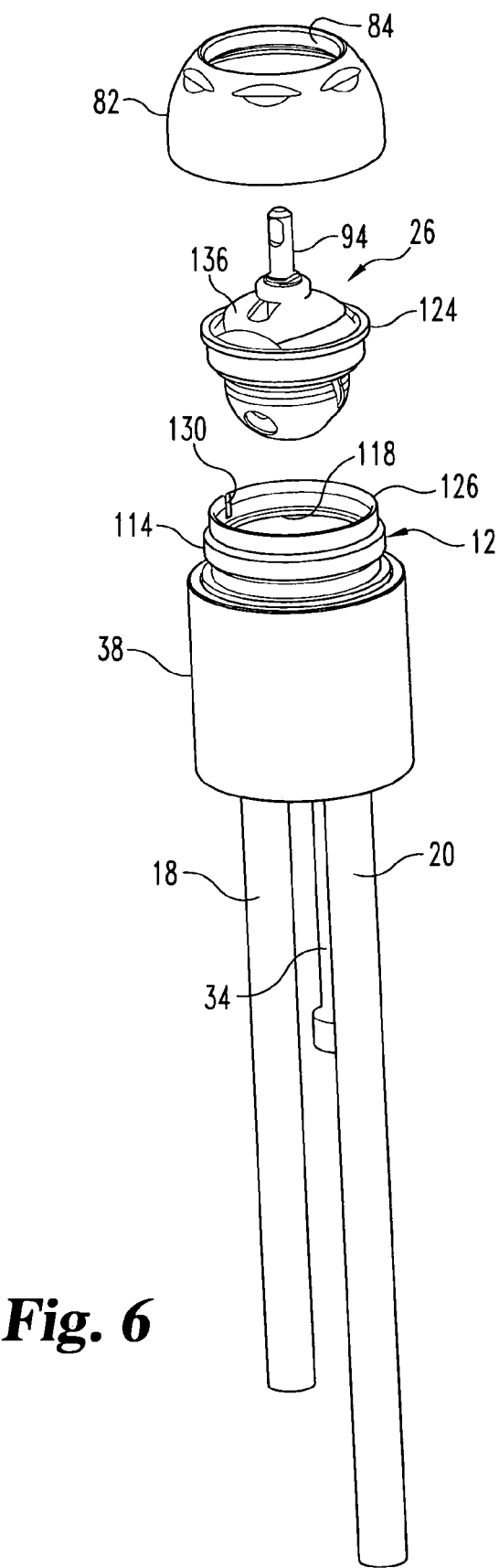
FIG. 6 is an external perspective view of the assembled replaceable cartridge of FIG. 3 along with an existing style base with which it is used.

When the cartridge assembly 26 is assembled from the parts shown in FIG. 5, the keeper 146 is positioned on stem 94 to provide the appropriate pressure between the spherical valve 86 and the hemispherical surface 106 of support element 102. Hemispherical surface 106 holds sphere 86 in position and seal lip 112 is positively urged against sphere 86 irrespective of whether cartridge 26 is free standing as shown in FIG. 6, or installed as shown in FIGS. 1 and 2. With the present invention, the spherical valve 86 is fixtured to the support element 102 in a very stable and tightly controlled fashion relative to prior proposals having the ball floating between two resilient elements. In addition, the replaceable cartridge 26 fits in the existing space allotted to prior art assemblies without adding any significant elements. It should be noted that the spherical valve element 86 has an elongated slot 152 which allows clearance for a pin found in prior ball valve assemblies that provides the function of anti-rotation. The assembly set forth in FIG. 5 already provides against unrestrained rotation because the parallel camming surfaces allow movement in an x and y direction but prevent rotation about the axis of stem 94.

Once the cartridge assembly 26 is assembled with the appropriate pressure, the cartridge is dropped into place in the base 12 after additional replaceable elements such as the seals 76 are replaced. As shown in FIG. 6, the cartridge assembly 26 is inserted into base 12 so that tab 128 is received in slot 130 and flange 124 of support element 102 abuts the upper edge 126 of base 12. At the same time, O-ring 118 provides a seal at the lower end of support element 102. The cover assembly 82 is then placed over the assembly and tightened to hold the cartridge assembly in place. It should be noted that the collar adjustment found on prior art spherical valve assemblies is not needed because all the clearances are set between the ball and the support element 102 which in turn is positively fixed in place in base 12.

The present invention contemplates modifications as would occur to those skilled in the art. It is also contemplated that the processes embodied in the present invention can be altered, rearranged, substituted, deleted, duplicated, combined, or added to other processes as would occur to those skilled in the art without departing from the spirit of the present invention. In addition, the various states, steps, procedures, techniques, phases and operations within these processes may be altered, rearranged, substituted, deleted, duplicated, or combined as would occur to those skilled in the art. All publications, patents and patent applications cited in this specification are herein incorporated by reference as if each individual publication, patent, or patent application was specifically and individually indicated to be incorporated by reference and set forth in its entirely herein.

What is claimed is:

1. A mixing valve comprising:
 a spherical valve element insertable on the base and having flow control passages;
 a stem connected to said spherical valve element and extending therefrom;
 a support element having a surface on one face that embraces a portion of the spherical valve element, said support element having an opening though which the stem extends, the support element having a cam surface on the other face thereof for guiding movement substantially in a given plane;
 a key element received over said stem and co-acting with said cam surface to permit movement in said given plane, said key element having an elongated slot with parallel sidewalls;
 said stem having at least one surface co-acting with one of said parallel sidewalls to prevent rotation of said stem and said spherical valve element relative to said key element; and
 a keeper connected to said stem for retaining said key element, support element, and spherical valve element as a unit, and wherein said stein has a guide for limiting movement of said stem relative to said key in a direction substantially perpendicular to said given plane.

2. Apparatus as claimed in claim 1 wherein said stem has a pair of opposed flat surfaces co-acting with said parallel sidewalls.

3. A mixing valve comprising:
 a spherical valve element insertable on the base and having flow control passages;
 a stem connected to said spherical valve element and extending therefrom;
 a support element having a surface on one face that embraces a portion of the spherical valve element, said support element having an opening through which the stem extends, the support element having a cam surface on the other face thereof for guiding movement substantially in a given plane, said cam surface on said support element being hemispherical with straight sidewalls defining opposite boundaries of said hemisphere;
 a key element received over said stem and co-acting with said cam surface to permit movement in said given plane, said key element having a surface following and abutting the hemispherical surface on said support element, said key element defined at its ends by flats substantially abutting the straight sided walls on the cam surface on said support element;

a keeper connected to said stem for retaining said key element, support element, and spherical valve elementas a unit, and wherein said stem has a guide for limiting movement of said stem relative to said key in a direction substantially perpendicular to said given plane.

4. Apparatus as claimed in claim 3 wherein said stem is threaded and wherein said keeper comprises a nut threaded over said stem.

5. Apparatus as claimed in claim 4 further comprises a washer positioned over said stem and fastened thereto.

* * * * *